United States Patent [19]
Wright

[11] Patent Number: 5,201,117
[45] Date of Patent: Apr. 13, 1993

[54] METHOD AND APPARATUS FOR SIZING AND CUTTING TUBING

[75] Inventor: William D. Wright, Lyndonville, N.Y.

[73] Assignee: General Motors Corporation, Detroit, Mich.

[21] Appl. No.: 787,480

[22] Filed: Nov. 4, 1991

[51] Int. Cl.⁵ .......................... B26F 3/00; B23P 15/26
[52] U.S. Cl. .................................... 29/890.05; 29/413; 29/417; 29/890.053; 225/96.5; 225/103
[58] Field of Search .......................... 225/2, 96.5, 103; 72/275, 338, 339, 464, 308, 309, 325, 367, 368; 29/33 T, 413, 414, 417, 890.05, 890.053

[56] References Cited

U.S. PATENT DOCUMENTS

| | | | |
|---|---|---|---|
| 1,106,741 | 8/1914 | Slick | 72/331 |
| 2,222,842 | 11/1940 | Humphrey. | |
| 2,444,463 | 7/1948 | Nordquist. | |
| 3,470,775 | 10/1969 | Marcovitch | 29/417 |
| 3,866,449 | 2/1975 | Wakabayashi et al. | 225/96.5 |
| 3,877,625 | 4/1975 | Brock | 225/2 |
| 3,913,207 | 10/1975 | Frey | 29/413 |
| 3,913,374 | 10/1975 | Esser et al. | 72/404 |
| 4,541,157 | 9/1985 | Tsushima et al. | 29/149.5 C |
| 4,719,967 | 1/1988 | Scarselletta | 165/76 |
| 5,133,492 | 7/1992 | Wohrstein et al. | 225/2 |

FOREIGN PATENT DOCUMENTS

| | | | |
|---|---|---|---|
| 339472 | 4/1936 | Italy | 29/413 |
| 0198798 | 8/1990 | Japan | 225/2 |

*Primary Examiner*—Hien H. Phan
*Attorney, Agent, or Firm*—Ronald L. Phillips

[57] ABSTRACT

Flat tubing is fed from a continuous supply into an embossing station and then into a cutting station and is briefly stopped periodically for an operation in each station. The embossing station has embossing dies for forming a transverse groove in the tube where a cut is desired and for reducing the tube perimeter dimension adjacent the cut to a required size. At the cutting station grippers engage the tubing on either side of the groove and bend the tubing to separate it at the groove.

1 Claim, 3 Drawing Sheets

METHOD AND APPARATUS FOR SIZING AND CUTTING TUBING

FIELD OF THE INVENTION

This invention relates to the fabrication of heat exchangers and more particularly to an apparatus and a method for cutting extruded tubing and sizing the tubing.

BACKGROUND OF THE INVENTION

In the fabrication of heat exchangers, extruded flat tubing with internal webs is frequently used to conduct a working fluid through a path in the heat exchanger. Sometimes, numerous tubes are networked together to form a plurality of paths. Regardless of the type of heat exchanger being made, and especially when making heat exchangers for automotive air conditioning units, it is very undesirable to generate burrs or metal fragments during the cutting of the tubing into usable lengths since the fragments, if not totally removed, clog and damage components of the system. Although rotary saw blades are commonly used in the industry for cutting the tubing, tubing cut in that manner results in numerous burrs and fragments. It is also known in other arts to cut long pieces of material into shorter length by scoring or grooving the material and bending the piece to break it at the score.

In many heat exchangers, the tubes are inserted into a common manifold and brazed to form a one-piece assembly. Burrs make tube insertion into the manifold very difficult and time consuming. The dimensional tolerance range of the extruded tubing is greater than that allowed in the braze operation or accepted by the manifold. For satisfactory installation into the manifold, the perimeter of the ends of the tubes must be sized down to an acceptable dimension for insertion. It is important, too, that the braze joint formed not possess any voids which may form leaks. In particular, the perimeter of the tube must be sized to fit snugly into the hole of a manifold or other end fitting.

It is seen then that there exists a need for an apparatus and method for sizing extruded tubing to desired perimeter dimensions and cutting the sized tubing to desired lengths without creating debris.

SUMMARY OF THE INVENTION

It is therefore an object of the invention to provide a method and apparatus for sizing the tube perimeter by embossing the tube and for cutting the tube by forming a groove in the tube followed by bending the tube the fracture it at the groove. It is another object to provide such method and apparatus which forms the groove in the tube in conjunction with the embossing operation.

The invention is carried out by the method of cutting continuous lengths of flat tubing into discrete tube lengths and sizing the perimeter of the tube adjacent the tube ends comprising the steps of: embossing the outer perimeter of tubing at a location where an end is desired for the dual purposes of forming a groove in the perimeter of the tubing and simultaneously reducing the perimeter size adjacent the groove to a desired dimension; and fracturing the tubing at a groove by bending the tubing to form a separate tube having a reduced perimeter size adjacent the end.

The invention is further carried out by apparatus for cutting lengths of tubing from continuous stock of tubing having flat sides and narrow edges and sizing the tubing perimeter adjacent the ends of cut lengths, comprising: an embossing station; a cutting station; means for feeding continuous tubing first to the embossing station and then to the cutting station; the embossing station including means for impressing a transverse groove means on the tubing in a plane where a cut is desired and for reducing the tubing perimeter adjacent the groove means; and the cutting station having means for fracturing the tubing at the said plane to form tube ends by bending the tubing at the groove means, whereby separate lengths of tubing are formed having a reduced perimeter adjacent the ends thereof.

The present invention is advantageous in that it provides for a method for sizing and cutting extruded tubing to desired dimensions which is much quicker than previous methods, and does not generate undesirable tube fragments or burrs on the tube while cutting the tubing into usable lengths. A chamfer of the tube ends caused by the embossing operation provides the additional advantage of making the tubing ends easier to insert into manifolds for heat exchangers. The present invention performs the sizing and groove embossing simultaneously and is particularly advantageous when used to perform these operations on flat extruded tubing with internal webs, as the internal webs allow embossing without requiring a mandrel to prevent tube collapse.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

In the manufacture of many heat exchangers, tubing is inserted through holes in a common manifold and brazed to form a one-piece assembly. The braze joint that is formed must not possess any voids which form leaks. For satisfactory assembly of the tubes and the manifold free of such voids, the perimeter of the tubes must be sized down to an acceptable dimension for insertion into the manifold. Also it is necessary to avoid the formation of burrs during cutting since burrs make tube insertion into the manifold difficult.

The present invention provides an apparatus and a method for cutting flat tubing into lengths and sizing the ends to a desired perimeter dimension wherein the tubing is provided in long pieces which may be supplied from continuous rolls of tubing. The tubing is fed into the apparatus which embosses the flat sides of the tubing and optionally the narrow edges of the tubing to simultaneously size the tubing perimeter and create a groove along the side of the tubing at the location of the desired cut. The apparatus then bends the tube at the groove to fracture the tube, thus defining a pair of tube ends. The outer tube walls adjacent the end have the desired perimeter dimension due to the embossing.

Figure 1:
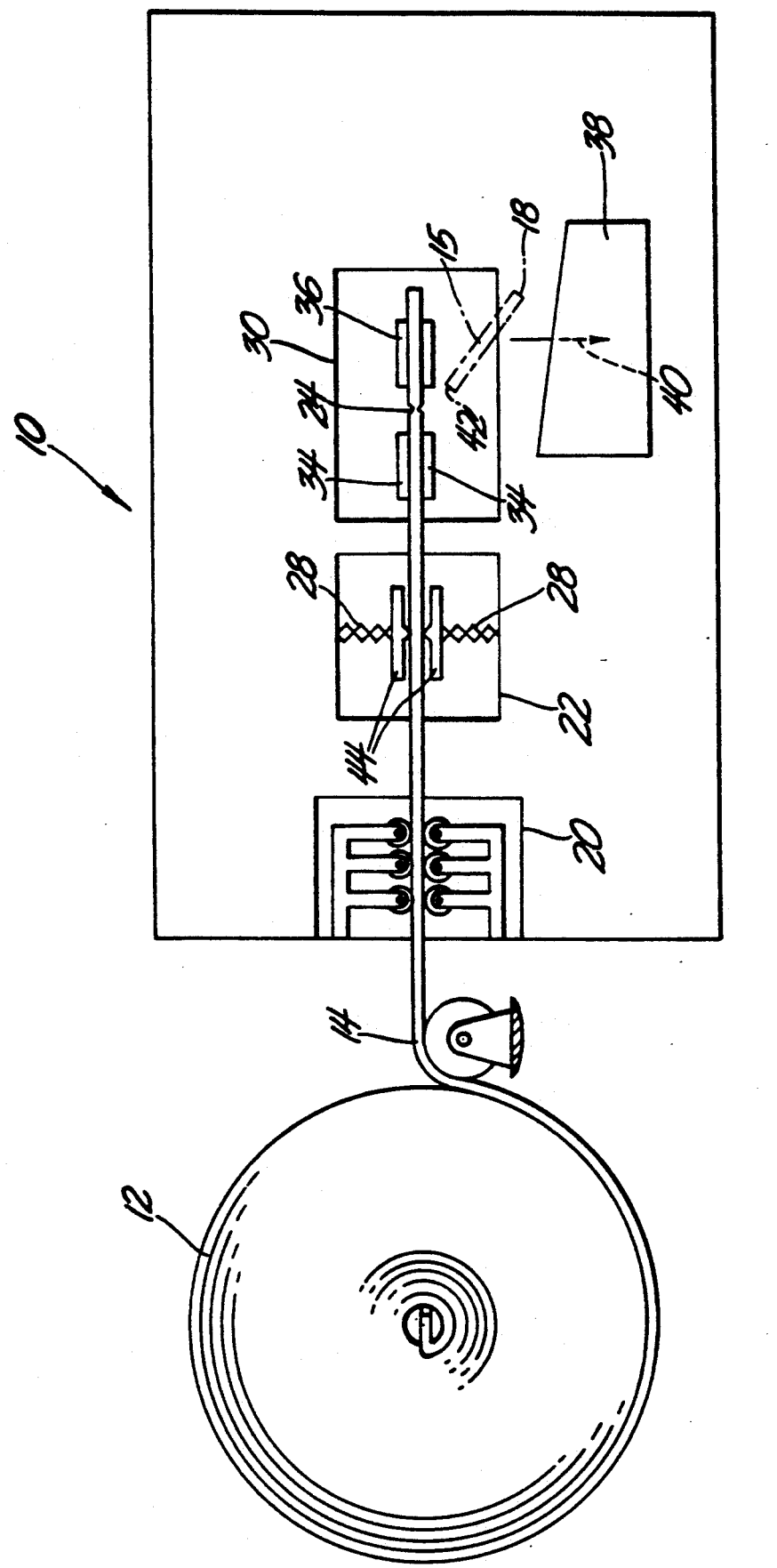
FIG. 1 is a schematic view of an apparatus for sizing and cutting tubing according to the invention.

In FIG. 1, an apparatus 10 which sizes tubing to a desired perimeter dimension and cuts the tubing into lengths is illustrated. Since extruded tubing is most commonly provided in large rolls 12 of continuous tubing 14, a straightening station 20 straightens the tubing as it is pulled from the roll 12. The tubing is fed through an embossing station 22 and then to a cutting station 30. At the embossing station 22 embossing dies 44 carried by mechanical arms 28 or by linear actuators, for example, embosses both flat sides of the tube 14.

Figure 2A:
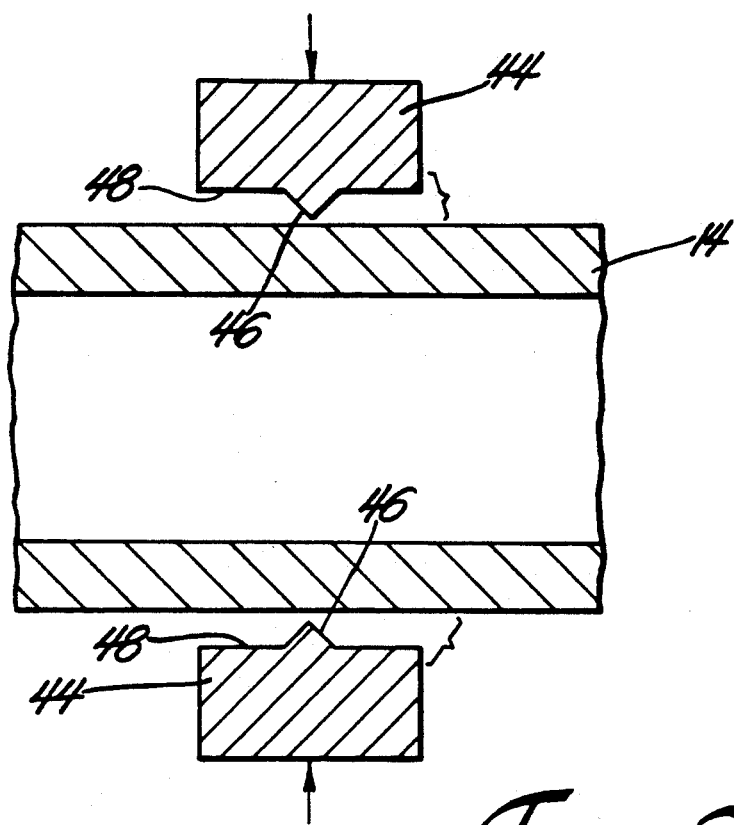
FIGS. 2A through 2C illustrate the sizing and embossing operations accomplished by the apparatus in FIG. 1.
Figure 2B:
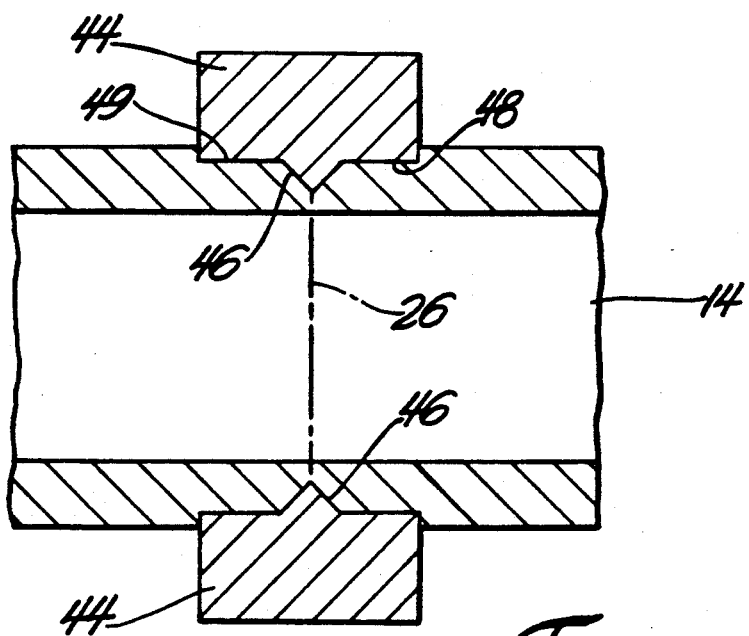
Figure 2C:
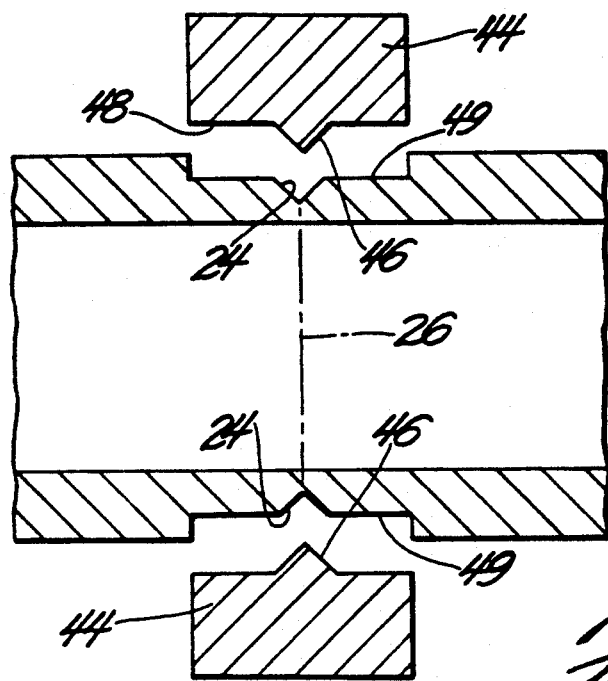

As shown in FIGS. 2A-2C, the embossing dies 44 comprise a flat embossing face 48 interrupted by a sharp linear ridge 46, and the dies 44 are aligned above and below the tube 14 so that the ridges 46 are in the same plane, referred to as the cutting plane 26. As the dies 44 emboss the tubing the shape of the die face is impressed into the flat sides of the tube 14 to form a pair of opposed grooves 24, and the thickness of the tube adjacent the grooves 24 is reduced, defining a reduced portion 49 which had been impressed by the flat embossing face 48. The final thickness of the tube measured across the embossed flat sides of portion 49 is determined by the travel of the dies into the tube wall which is controlled by the arms 28 through mechanical, electronic or other means, not shown. The depth of the grooves 24 below the embossed sides of the reduced portion 49 is determined by the size of the ridge 46 on the dies 44. The groove depth must be sufficient to assure fracture of the tube along the cutting plane 26 upon bending of the tube at the groove.

Referring again to FIG. 1, the tube 14, after the embossing step, is fed by an amount equal to the desired tube length to position a new tube section in the embossing station where the sizing and grooving operation is repeated. The previously embossed portion is advanced to a cutting station 30 where the tube is separated or cut simultaneously with the embossing in the embossing station 22. In the cutting station 30 first grippers 34 engage and hold the tube on one side of the grooves nearest the embossing station and second grippers 36 hold the tube at the other side of the grooves 24. The grippers are operated by any suitable means such as mechanical or electrical devices. While the grippers 34 remain stationary, the grippers 36 are maneuvered to twist or bend the tube and then release it. The twisting or bending causes the tube 14 to fracture along the cutting plane 26 forming a separate tube 15 having an end 42 formed by the fracturing of the tube and an end 18 formed by an earlier cut. The separate finished tube 15 falls, as indicated by the arrow 40, into a bin 38. Thus the tubing fed from the roll 12 is progressively cut into lengths, the feeding occurring to advance the tube after each embossing and cutting operation and stopping only briefly for the embossing and cutting to simultaneously occur.

The process results in no or minimal cutting debris and the tube ends are free of burrs. Due to the embossing of the tube adjacent the ends, the tube ends are sized properly for a good fit into a manifold or other end fitting, ready for a brazing operation to provide leak free joints.

Figure 3:
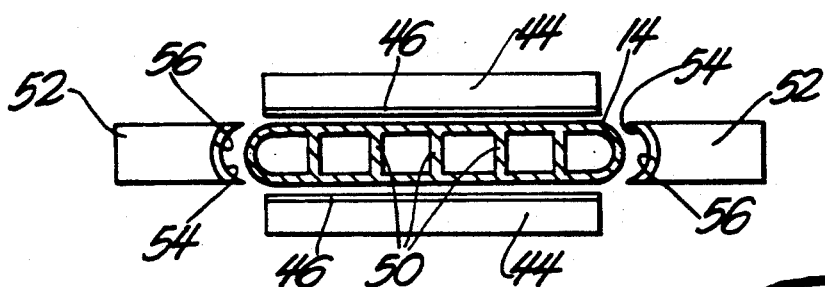
FIG. 3 is a cross-sectional view of a flat tube surrounded by embossing dies, according to the invention.

In a second embodiment of the invention the edges of the tube are sized and grooved simultaneously with the flat sides. FIG. 3 shows the flat tubing 14 in cross section which reveals the internal webs 50 in the tubing. The dies 44 are positioned adjacent the flat side of the tube and additional dies 52 are arranged adjacent the edges of the tube and are coupled to the arms 28 or other driving means to emboss the edges when the dies 44 emboss the sides. The dies 52 have curved ridges 54 and faces 56 to conform to the shape of the tubing edges. By sizing and grooving the edges as well as the sides, the separation in the cutting station is facilitated and the dimension of the width is reduced.

Figure 4:
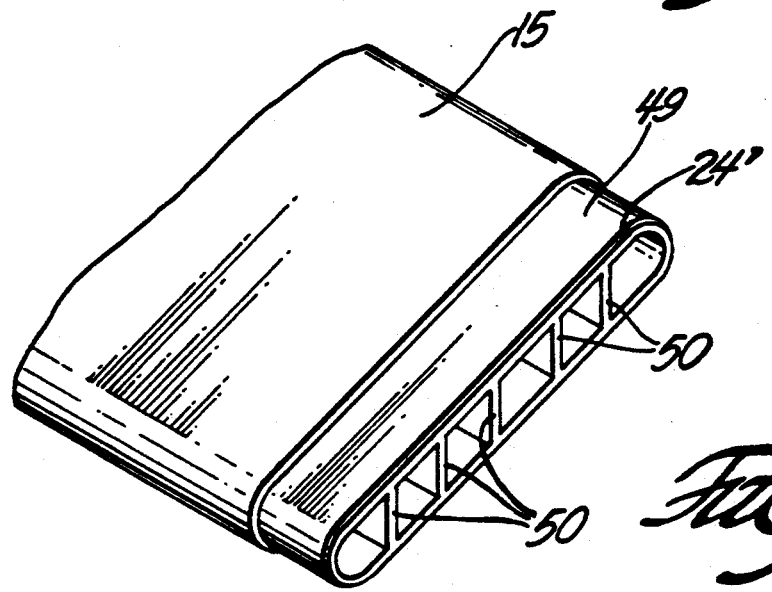
FIG. 4 is an isometric view of a finished tube end after being sized and cut by the method of the invention.

FIG. 4 illustrates the end of a finished tube 15 formed by the process which uses both sets of dies 44 and 52. The reduced dimension portion 49 adjacent the end is formed by the face portion 48 and 56 of the dies 44 and 52 respectively. A chamfer 24' remaining from the groove 24 is formed by the ridges 46 and 54. As an example, a tube 15 having an extruded size of 1.5 inch wide and 0.16 inch deep has a reduced dimension portion 49 of 1.492 inch wide and 0.154 inch deep. The groove 24 in the tubing 14 is about 0.090 inch deep. The ridge 46 or 54 on the dies which form the groove is preferably as sharp as possible consistent with durability. A ridge angle of about 45° has been found to be satisfactory. The tubing when grooved in this manner produces a clean break in the cutting station 30 with little or no debris and no burrs to impede insertion into the manifold. The resulting chamfer 24' aids insertion into a hole in the manifold. The reduced portion 49 has accurately controlled dimensions to properly fit into the manifold to form a secure joint for successful brazing.

The embodiments of the invention in which an exclusive property or privilege is claimed are defined as follows:

1. Apparatus for cutting lengths of tubing from continuous stock of tubing having flat sides and narrow edges and sizing the tubing perimeter adjacent the ends of cut lengths, comprising:

an embossing station;

a cutting station;

means for feeding continuous tubing first to the embossing station and then to the cutting station, and, a pair of opposed dies at the embossing station for impressing the flat sides of the tubing, each die having a sharp ridge for forming a transverse groove in a flat side of the tubing where a cut is desired and for reducing the tubing perimeter adjacent the groove, each die also having a face adjacent the ridge conforming to a desired edge shape for forming a shaped surface on the narrow edges of the tubing; and, the cutting station further having means for fracturing the tubing at the groove, whereby separate lengths of the tubing are formed having a reduced perimeter adjacent the ends thereof.

* * * * *